United States Patent [19]
Sakurai et al.

[11] Patent Number: 5,862,016
[45] Date of Patent: Jan. 19, 1999

[54] MAGNETIC HEAD CARTRIDGE HAVING HEAD CONNECTED TO A GIMBAL AND HAVING LEADS EXTENDING THROUGH OPENINGS IN THE GIMBAL AND OPENINGS IN THE HEAD CARRIAGE

[75] Inventors: Yoshikazu Sakurai; Hiroshi Sampei; Masashi Sato, all of Yamagata, Japan

[73] Assignee: Mitsumi Electric Co., Ltd., Tokyo, Japan

[21] Appl. No.: 902,111

[22] Filed: Jul. 29, 1997

[30] Foreign Application Priority Data

Jul. 30, 1996 [JP] Japan .................................. 8-216784

[51] Int. Cl.$^6$ ............................... G11B 5/54; G11B 5/17
[52] U.S. Cl. ........................................... 360/104; 360/123
[58] Field of Search ....................... 360/99.01, 104–106, 360/108, 123

[56] References Cited

U.S. PATENT DOCUMENTS

| | | | |
|---|---|---|---|
| 4,811,140 | 3/1989 | Enami et al. ............................. | 360/104 |
| 5,166,846 | 11/1992 | Shigemoto ............................... | 360/104 |
| 5,305,167 | 4/1994 | Nagase et al. ........................... | 360/104 |
| 5,343,344 | 8/1994 | Nagase .................................... | 360/104 |
| 5,396,390 | 3/1995 | Arakawa et al. ....................... | 360/123 |
| 5,463,513 | 10/1995 | Hoshino ................................. | 360/104 |
| 5,535,080 | 7/1996 | Inoue et al. ............................ | 360/129 |

*Primary Examiner*—Jefferson Evans
*Attorney, Agent, or Firm*—Whitham, Curtis & Whitham

[57] ABSTRACT

A magnetic head carriage including a head carriage (13), a gimbal (11) which has a magnetic head (12) attached thereon and is fixed to one surface of the head carriage (13), a flexible substrate (14) fixed to the other surface of the head carriage (13), and leads (12d, 12e, 12f, 12f) from the magnetic head (12) and are conductively connected to electrodes (15, 16, 17, 18) formed on the flexible substrate (14), the head carriage (13) comprising opening holes (14a, 14b, 14c, 14d) which are opened in the flexible substrate (14) in the vicinity of the electrodes (15, 16, 17, 18) so as to position the leads (12d, 12e, 12f, 12g) at the respective electrodes (15, 16, 17, 18).

9 Claims, 2 Drawing Sheets

MAGNETIC HEAD CARTRIDGE HAVING HEAD CONNECTED TO A GIMBAL AND HAVING LEADS EXTENDING THROUGH OPENINGS IN THE GIMBAL AND OPENINGS IN THE HEAD CARRIAGE

BACKGROUND OF THE INVENTION

1. Field of the Invention

The present invention relates to a magnetic head carriage, and more particularly to a magnetic head carriage which records or reproduces data on or from a floppy disk.

2. Related Art

In a magnetic disk device such as a floppy disk device, data are recorded or reproduced by a magnetic head. The magnetic head is supported by a head carriage and is moved to an arbitrary position on the floppy disk by moving the head carriage between the internal and outer circumferences of the floppy disk. In recent years, high-density recording or reproduction of data is achieved, and floppy disks having 1-megabyte or 2-megabyte capacity to those having storage capacity greater than 100 MB have already been developed.

FIG. 5 is a schematic representation for explaining an existing magnetic head carriage. In FIG. 5, reference numeral 1 designates a magnetic head having a magnetic head core (omitted from FIG. 5); 2 designates a coil which is comprised of leads 2a, 2b wound around a magnetic head core; and 3 designates a flexible substrate having electrodes 4, 5, 6, and 7 formed thereon. A gimbal for fixing the magnetic head 1 and a head carriage existing between the gimbal and the flexible substrate are omitted from the drawing.

The leads 2a, 2b of the coil are conductively connected the electrodes 4, 5 of the flexible substrate 3 by soldering.

In the magnetic head carriage having the foregoing construction, since the leads 2a, 2b of the coil are not fixed to the electrodes 4, 5 of the flexible substrate 3, the leads 2a, 2b are difficult to be connected to the electrodes 4, 5.

SUMMARY OF THE INVENTION

The previously-described problem is solved by a magnetic head carriage including a head carriage, a gimbal which has a magnetic head attached thereon and is fixed to one surface of the head carriage, a flexible substrate fixed to the other surface of the head carriage, and leads which form the magnetic head and are conductively connected to electrodes formed on the flexible substrate, the head carriage comprising:

opening holes which are opened in the flexible substrate in the vicinity of the electrodes so as to position the leads at the respective electrodes.

Preferably, the problem is solved by passing the leads of the coil through the opening holes, and by conductively connecting the thus-passed leads to the electrodes formed on the flexible substrate.

Preferably, the problem is solved by providing metal pins on the head carriage, fitting the metal pins into the opening holes formed in the flexible substrate, and conductively connecting the leads of the coil to the pins.

With this configuration, the opening holes are formed in the flexible substrate in the vicinity of the electrodes, and the leads are positioned to the electrodes. Consequently, the leads 2a, 2b of the coil are easily soldered to the electrodes.

The leads of the coil are passed through the opening holes and are conductively connected to the electrodes formed on the flexible substrate. Since the leads are fixed in this case, the leads are easily soldered to the electrodes.

The metal pins are provided on the head carriage and are fitted into the opening holes formed in the flexible substrate. The leads of the coil are conductively connected to the metal pins. Since the flexible substrate is fixed in this case, the electrodes are positioned, thereby rendering the soldering of the leads to the electrodes easy.

DETAILED DESCRIPTION OF THE PREFERRED EMBODIMENTS

Figure 1:
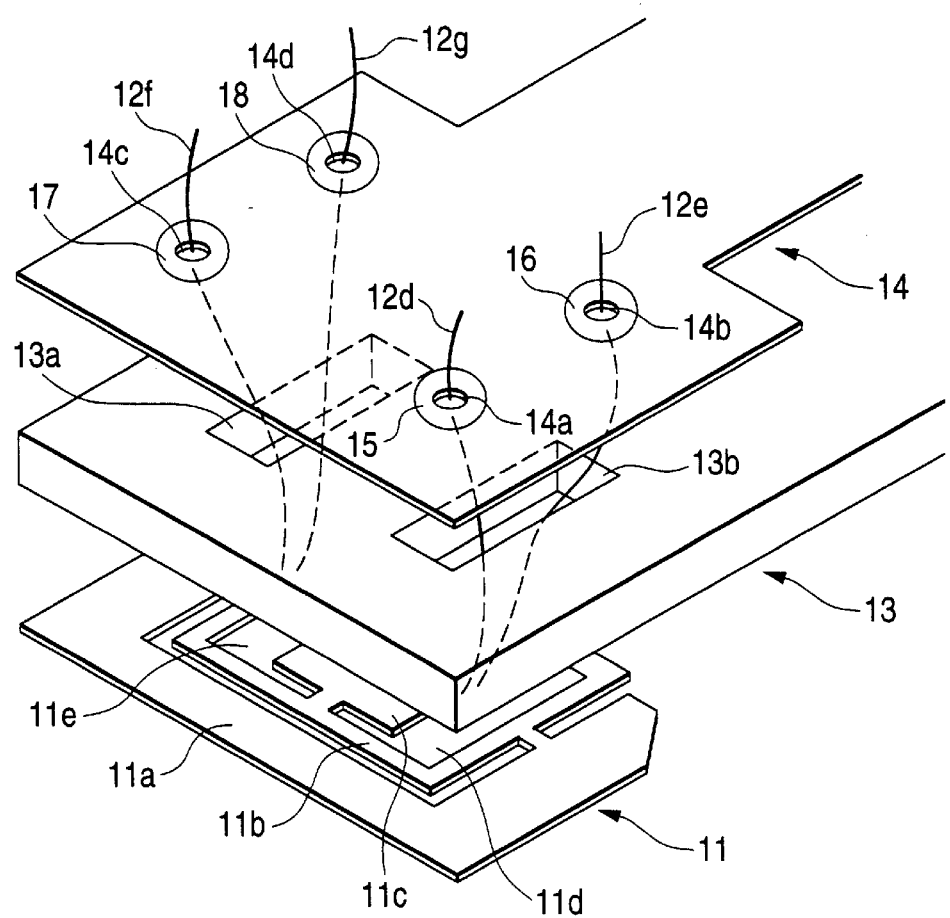
FIG. 1 is an exploded perspective view illustrating a magnetic head carriage according to a first embodiment of the present invention.
Figure 2:
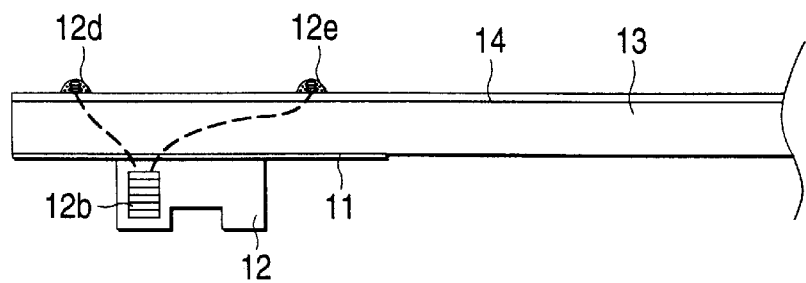
FIG. 2 is a side view of the magnetic head of the first embodiment.
Figure 3:
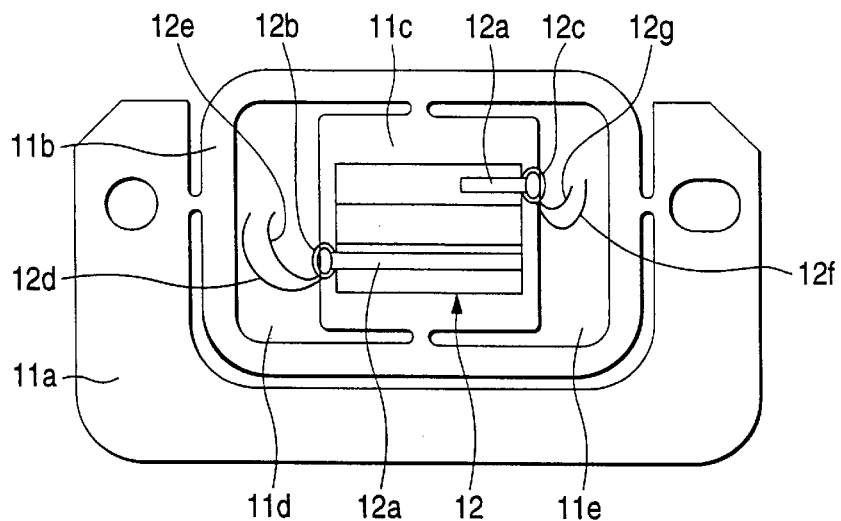
FIG. 3 is a plan view illustrating the magnetic head and gimbal of the magnetic head carriage according to the first embodiment.

With reference to FIGS. 1, 2, and 3, a magnetic head carriage according to a first embodiment of the present invention will be described. As shown in FIG. 3, a metal plate-like gimbal 11 is comprised of an outer frame 11a, a first movable portion 11b, a second movable portion 11c, and opening holes 11d, 11e. A magnetic head 12 is mounted on the second movable portion 11c. The magnetic head 12 is comprised of a magnetic head core 12a, coils 12b, 12c wound around the magnetic head core 12a, and leads 12d, 12e, 12f, and 12g of the coils 12b, 12c.

Reference numeral 13 designates a head carriage formed from resin material, and reference numeral 14 designates a flexible substrate which has opening holes 14a, 14b, 14c, and 14d formed therein and has electrodes 15, 16, 17, and 18 formed thereon. More specifically, the electrodes 15, 16, 17, and 18 are formed along the respective edges of the opening holes 14a, 14b, 14c, and 14d. An opening hole 13b of the head carriage 13 and opening holes 14a, 14b of the flexible substrate 14 are positioned above the opening hole 11d, thereby ensuring passage of the leads 12d, 12e. The same applies to the leads 12f, 12g. A wiring section to be formed on the flexible substrate 14 is omitted from the drawings.

As shown in FIG. 1, the leads 12d, 12e of the coil 12b of the magnetic head 12 protrude in the vicinity of the electrodes 15, 16 of the flexible substrate 14 after having passed through the opening hole 11d of the gimbal 11, the opening hole 13b of the head carriage 13, and the opening holes 14a, 14b of the flexible substrate 14. The leads 12d and 12e are conductively connected to the respective electrodes 15 and 16 by soldering the thus-protruding portions of the leads. At this time, the flexible substrate 14 is fixed by passing the leads 12d, 12e through the opening holes 14a, 14b, thereby rendering the soldering of the leads 12d, 12e to the electrodes 15, 16.

The leads 12f, 12g of the coil 12c are conductively connected to the electrodes 17, 18 by soldering in the same manner, and hence their explanations will be omitted here for brevity.

Figure 4:
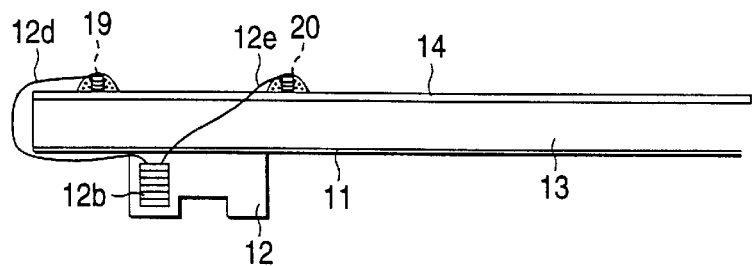
FIG. 4 is a side view illustrating a magnetic head carriage according to a second embodiment of the present invention.
Figure 5:
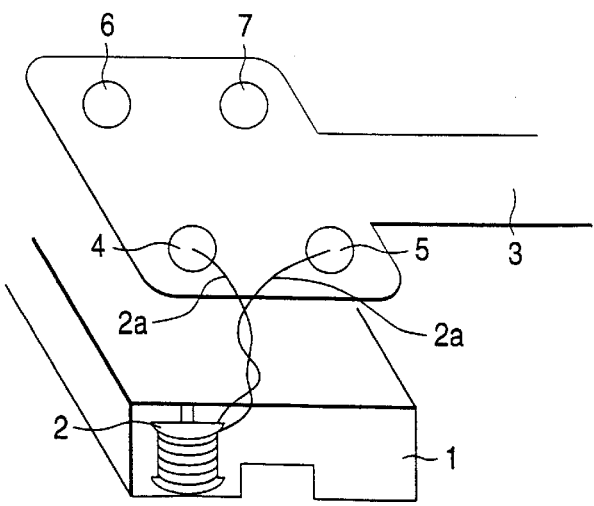
FIG. 5 is an exploded perspective view showing the principal portion of an existing magnetic head carriage.

FIG. 4 is a schematic representation for explaining a magnetic head carriage according to a second embodiment of the present invention. In the drawing, the elements which are the same as those used in the first embodiment will be assigned the same reference numerals, and their detailed explanations will be omitted. In the second embodiment, pins 19, 20, 21, 22 (21 and 22 are omitted from FIG. 4), all of which are formed from metal material, are fixedly provided on the head carriage 13. The leads 12*d*, 12*e* are tied to the pins 19, 20 and are conductively connected to the electrodes 15, 16 of the flexible substrate 14 by soldering. The same applies to the case where the leads 12*f*, 12*g* are conductively connected to the electrodes 17, 18 of the flexible substrate 14 by way of the pins 21, 22.

With the previous construction, the pins 19, 20, 21, and 22 are fitted into the opening holes 14*a*, 14*b*, 14*c*, and 14*d*, whereby the flexible substrate 14 is fixed. Consequently, the leads 12*d*, 12*e*, 12*f*, and 12*g* are easily soldered to the electrodes 15, 16, 17, and 18, respectively.

As previously described, a magnetic head carriage includes a head carriage, a gimbal which has a magnetic head attached thereon and is fixed to one surface of the head carriage, a flexible substrate fixed to the other surface of the head carriage, and leads which form the magnetic head and are conductively connected to electrodes formed on the flexible substrate, and opening holes are opened in the flexible substrate in the vicinity of the electrodes so as to position the leads at the respective electrodes. As a result, it becomes easy to conductively connect the leads of the coil stored in the magnetic head to the electrodes of the flexible substrate, thereby resulting in improved productivity.

The leads of the coil are passed through the opening holes, and the thus-passed leads are conductively connected to the electrodes formed on the flexible substrate. Since the leads are fixed in this case, the leads are easily soldered to the electrodes.

The metal pins are provided on the head carriage and are fitted into the opening holes formed in the flexible substrate. The leads of the coil are conductively connected to the metal pins. Since the flexible substrate is fixed in this case, the electrodes are positioned, thereby rendering the soldering of the leads to the electrodes easy.

What is claimed is:

1. A magnetic head carriage comprising:

a head carriage having opening holes therethrough;

a gimbal having a magnetic head attached thereon and fixed to one surface of the head carriage;

a flexible substrate fixed to a second, opposite surface of the head carriage, said flexible substrate having opening holes therethrough over said opening holes in said head carriage, and flexible wire coil leads of said magnetic head conductively connected to electrodes formed on the flexible substrate, wherein said opening holes in the flexible substrate are positioned in the vicinity of the electrodes so as to position the flexible wire coil leads passing through said opening holes in said head carriage at the electrodes.

2. The magnetic head carriage as defined in claim 1, wherein the flexible wire coil leads are passed through the opening holes in said head carriage and in said flexible substrate, and the flexible wire leads are conductively connected to the electrodes formed on the flexible substrate.

3. The magnetic head carriage as defined in claim 1 further comprising:

metal pins provided on the head carriage, wherein the metal pins are fitted into the opening holes formed in the flexible substrate and the flexible wire coil leads are conductively connected to the pins.

4. A magnetic head carriage for a disk drive, comprising:

a head carriage having channels therethrough forming parallel openings;

a gimbal attached to a bottom side of said head carriage, said gimbal comprising an outer frame and having a first movable portion connected at two inner points of said outer frame and a second movable portion connected at two inner points of said first movable portion;

a magnetic head connected to said second movable portion of said gimbal; and a flexible substrate positioned on a top side of said head carriage and having a plurality of electrodes positioned thereon, each of said electrodes formed around an opening hole in said flexible substrate positioned over said parallel openings in said head carriage, wherein flexible wire leads from said magnetic head pass between said first and second movable portions of said gimbal, through said parallel openings in said head carriage, and through said opening holes in said flexible substrate to said electrodes.

5. A magnetic head carriage for a disk drive as recited in claim 4 wherein said flexible wire leads are secured to said electrodes with a pin inserted into the opening holes in said flexible substrate.

6. A magnetic head carriage for a disk drive as recited in claim 4, wherein said two inner points of said outer frame and said two inner points of said first movable portion are perpendicular to one another.

7. A magnetic head carriage for a disk drive as recited in claim 4 wherein said first movable portion and said second movable portion comprise concentric rectangular portions.

8. A magnetic head carriage for a disk drive as recited in claim 4 wherein said flexible wire leads are soldered to said electrodes.

9. A magnetic head carriage for a disk drive as recited in claim 4 wherein said gimbal comprises a metal plate.

* * * * *